fig# United States Patent [19]

Lübbehusen

[11] 4,118,075
[45] Oct. 3, 1978

[54] BULK MATERIAL DELIVERY APPARATUS

[75] Inventor: Paul Lübbehusen, Ravensburg-Durnast, Fed. Rep. of Germany

[73] Assignee: Waeschle Maschinenfabrik GmbH, Ravensburg, Fed. Rep. of Germany

[21] Appl. No.: 802,430

[22] Filed: Jun. 1, 1977

[30] Foreign Application Priority Data

Jun. 4, 1976 [DE] Fed. Rep. of Germany ....... 2625263

[51] Int. Cl.$^2$ ............................................. B65G 53/40
[52] U.S. Cl. ........................................ 302/53; 302/57
[58] Field of Search ....................... 302/17, 36, 53, 57, 302/51, 55

[56] References Cited

U.S. PATENT DOCUMENTS

| 3,253,866 | 5/1966 | Bozich | 302/53 |
| 3,644,003 | 2/1972 | Funk | 302/53 |
| 3,727,985 | 4/1973 | Reuter | 302/53 |

FOREIGN PATENT DOCUMENTS

| 2,443,865 | 3/1976 | Fed. Rep. of Germany | 302/53 |
| 376,430 | 5/1964 | Switzerland | 302/53 |
| 995,051 | 6/1965 | United Kingdom | 302/55 |
| 1,106,082 | 3/1968 | United Kingdom | 302/53 |

Primary Examiner—Evon C. Blunk
Assistant Examiner—James L. Rowland
Attorney, Agent, or Firm—Donald D. Jeffery

[57] ABSTRACT

Apparatus for discharging bulk material into a pneumatic conveyor conduit has two chambers, one disposed above the other, the upper chamber having an inlet orifice controllable by a pivotal closure flap and the lower chamber communicating with an outlet orifice from the upper chamber, also controllable by a pivotal closure flap. The flaps are balanced as by counterweights so as to leave their respective orifices virtually completely open in the absence of outside force acting on the flaps, and pressure nozzles are disposed adjacent the flaps in their fully open position, to assist movement towards their closed positions as required. A level sensing means is arranged in the lower chamber to sense when material therein drops to a predetermined level, for re-filling of the chamber from the upper chamber.

4 Claims, 3 Drawing Figures

BULK MATERIAL DELIVERY APPARATUS

BACKGROUND OF THE INVENTION

One of the characteristic parameters in describing the flow condition within a pneumatic conveyor conduit is the loading $\mu$, which indicates the relationship between the mass flow of bulk material, i.e. the through-put of material, and the mass flow of gas. In this connection, the conveying operation becomes more economical in proportion as the above-mentioned loading is increased, that is to say, as the weight of bulk material which is transported for example with one kilogram of air increases. Obviously, the pressure differential required for the pneumatic conveying operation also rises with increasing loading $\mu$. At the same time, in order to avoid the necessity of using large amounts of conveyor air with the resulting disadvantages, and in order to keep wear and noise in the conveyor conduit and associated equipment to a low level, industrial practice is to attempt to operate with the lowest possible conveyor air velocity. It will be appreciated that, as this means that the conveyor pressures must accordingly be very high, problems arise with respect to the operation of introducing the bulk material to be transported from the atmosphere into the conveyor conduit in which there is a substantially increased pressure, and in metering and controlling such input of bulk material.

When operating with high conveyor pressures, for example a pressure of several bars, pressurized containers or pressure tanks are used, virtually without exception, for the pneumatic conveying operation. When such containers are employed as independent units, they suffer from the disadvantage that they can only be filled and then emptied, in succession. This discontinuous mode of operation, and the resulting dead periods which do not make any contribution to the conveying action, mean that the equipment must be of such dimensions that the through-put of bulk material during the active conveying phase is about 50 to 100% higher than its mean value in time, and pipes, compressors, separators and other fittings of the equipment suffer from a corresponding increase in size.

An improvement can be achieved in this respect, by using pressurized containers which are connected in parallel with each other, as in such an arrangement one container is filled while the other is emptied.

Arranging two pressurized containers in succession, one above the other, alternatively makes it possible to provide for a continuous pneumatic conveying operation. With this arrangement, firstly the upper container is filled. Subsequently, the filling opening of the upper container is closed and then the upper and lower containers are brought to the same pressure via a balancing conduit. The bulk material in the lower container can now be discharged into the conveyor conduit and conveyed pneumatically. After the outlet of the upper container has been closed again, the upper container is filled and the charging cycle is repeated.

If the two containers are reduced in size, use is often made of an arrangement known as a double-pendulum flap valve assembly. In this arrangement, the flaps are closed and opened alternately by a mechanical actuating means from the outside of the containers. The bulk material first falls from a storage container into a middle chamber which is subsequently discharged into a conveyor chamber which is under pressure. As the flaps must be opened against the pressure force which prevails below them, considerable actuating forces are required. In one construction, such forces are reduced by the closure flaps themselves not being fixedly connected to the actuating means. Instead, the actuating means is connected only to auxiliary flaps which can move upwardly into contact with the freely hanging main closure flaps, and thereby close openings in such flaps. The actual closure force for the main flaps is applied by the upwardly directed pressure differential. The actuating means is required to exert only a small force for opening the auxiliary flaps, as, when the auxiliary flaps open the openings in the main flap, there occurs pressure equalization between the chambers lying above and below the main flap, and the upper flap opens automatically, due to the force of gravity acting thereon.

However, this double flap assembly suffers from the disadvantage that it is actuated mechanically from the exterior, which means that rotary actuating members must be extended from the dust-bearing pressurized chamber into the atmosphere. In addition, it can happen that particles of bulk material may become trapped by the auxiliary flaps at the openings in the main flaps, so that the upper pressure chamber cannot be correctly sealed off. When that happens, an air-dust mixture can flow through the resulting gap, at a speed approximating the speed of sound. On the one hand this results in loss of air from the pressure chamber and on the other hand it also causes wear of the sealing surfaces, as by a sand blasting effect. In addition, most double pendulum flaps can only be used for conveyor pressures of up to about 2.5 bars.

One form of apparatus for the delivery of bulk material into a conveyor conduit, comprises a first chamber or antechamber whose inlet can be closed by a first closure flap and which has an outlet communicating with a second or conveyor chamber below the antechamber. A second flap is provided to close the outlet from the antechamber. The conveyor chamber has an outlet for connection to the conveyor conduit. The conveyor chamber is also connected to a conduit for supplying clean pressure air to the conveyor conduit for material conveying purposes, via a branch conduit. An air connecting conduit with a shut-off valve interconnects the antechamber and the conveyor chamber, while a vent with a vent control valve connects the antechamber to atmosphere. The apparatus also has a control means for alternate actuation of the shut-off valve and the vent valve. The first, upper, closure flap, when in an unloaded condition, only provides a narrow gap for the intake of the bulk material into the antechamber, and the lower, second, closure flap, which is in the form of a spring-loaded conical valve, does not open the antechamber outlet at all when in the unloaded condition, and only opens the antechamber outlet to the extent of providing an annular gap, when bulk material loads the conical valve. The small free cross-sectional areas produced by such valves permit only a low through-put of bulk material or make it necessary for the corresponding openings and the associated closure flaps to be of very large dimensions. Furthermore, this apparatus can easily suffer from operational trouble, if bulk material remains lying on one or both of the closure flaps, and thereby prevents the closure flap or flaps from completely closing. At high conveyor pressures, the bulk material then entrained by the flow of leakage air through the openings left by the incomplete closure of the flaps can then cause a weakening of the sealing action. In addition, in this apparatus, the various charging and venting valves are controlled by way of a gear assembly, which means that a given dead time must necessarily be provided in the operating cycle, in order to ensure that the conveyor chamber is always completely emptied before a fresh filling operation, as otherwise the conveyor chamber could be overfilled. The apparatus can therefore not operate with the optimum through-put of bulk material.

SUMMARY OF THE INVENTION

An object of the invention is to provide an apparatus for delivering bulk material into a pneumatic conveyor conduit, which overcomes the above-mentioned disadvantages.

A further object of the invention is to provide a bulk material delivery apparatus which for a given structural size provides for optimum through-put of bulk material into a conveyor conduit.

Yet another object of the invention is to provide an apparatus for the delivery of bulk material into a conveyor conduit which operates with a high degree of operating reliability but which does not suffer from serious problems in the sealing of closure flap actuating members.

A still further object of the invention is to provide an apparatus for the delivery of bulk material into a conveyor conduit, which can provide for continuous conveying operation without dead periods, and which enjoys a high degree of sensitivity in operation.

These and other objects are achieved by apparatus which comprises a first chamber or antechamber having an inlet which can be closed by a first closure flap. The first closure flap is mounted for pivotal movement about a horizontal axis between a position of closing the inlet and a position of opening the inlet, the flap being substantially balanced by a counterweight. The antechamber also has an outlet which opens into a second or conveyor chamber disposed below the antechamber, the outlet having associated therewith a second closure flap which is also mounted for pivotal movement about a horizontal axis between closed and open positions and which also has a balancing counterweight. The conveyor chamber has an outlet for connection to the conveyor conduit, and has a level sensing means which is arranged in the vicinity of the outlet, which sensing means provides a control signal to indicate a predetermined fall in the level of material in the conveyor chamber, to provide for re-filling thereof. The two closure flaps are mounted pivotally in such a way that, when they are not acted upon by any outside force such as the weight of bulk material lying thereon, or other air forces, the closure flaps virtually completely open the respective openings with which they are associated. The conveyor chamber is also in communication with a conduit for introducing the clean conveying air into the conveyor conduit, such communication being by a branch conduit which communicates with an air flow connecting conduit connecting the conveyor chamber and the antechamber. The air flow connecting conduit includes a shut-off valve to control air flow between the two chambers. The antechamber also has a vent conduit for communicating the antechamber with free atmosphere, including a vent valve to close such communication. The shut-off valve and the vent valve are controlled by a suitable control means to which the level sensing means in the conveyor chamber is also operatively connected. The air flow connecting conduit is provided with nozzles within the respective chambers, which are directed towards the respective closure flaps to assist movement thereof towards the closing position.

The apparatus may further include a shut-off member which is operable, as by a fluid-actuated piston-cylinder unit, between positions of opening and closing the inlet into the antechamber, actuation of the shut-off member being substantially synchronized with that of the first closure flap. The control means may also include a timing arrangement for actuating the shut-off member, while the antechamber may further include a level sensing means operable to actuate the shut-off member, by way of a signal to the control means which thus actuates the shut-off member.

BRIEF DESCRIPTION OF THE DRAWINGS

FIG. 2 shows a general diagrammatic view of a bulk material conveyor equipment provided with the apparatus of FIGS. 1 and 1a.

DESCRIPTION OF THE PREFERRED EMBODIMENT

Figure 1:
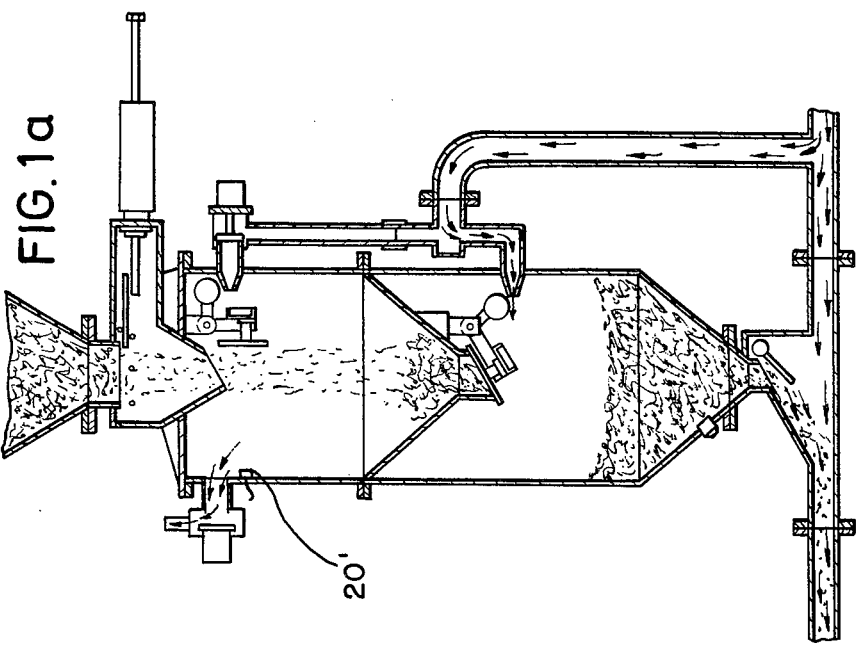
FIGS. 1 and 1a show the delivery apparatus in two different operating phases.
Figure 1A:
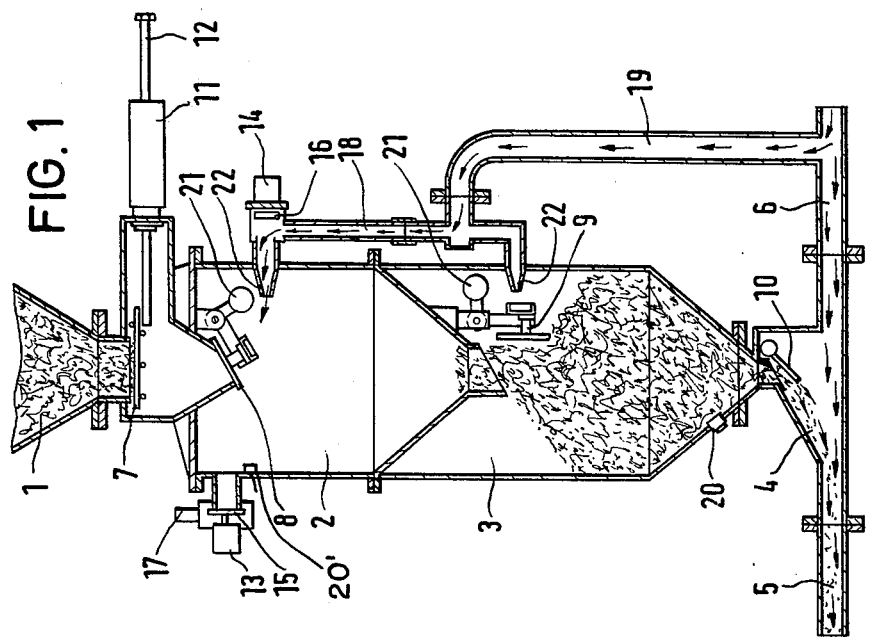

Referring to FIGS. 1 and 1a, the apparatus includes a bulk material inlet 1 which opens into a first chamber or antechamber 2. The antechamber 2 has an outlet which communicates with a second or conveyor chamber 3 disposed below the antechamber 2. The chamber 3 communicates by way of an outlet 4 with a conveyor conduit 5, for the pneumatic conveying of bulk material. The bulk material is conveyed, e.g., to its place of use by means of compressed air which is introduced into the conveyor conduit 5 by a clean air pressure conduit 6.

Disposed above the opening of the inlet 1 into the antechamber 2 is a shut-off slide valve 7 actuable by a compressed air piston-cylinder unit 11. The effective cross-sectional area of the inlet 1, which is opened for bulk material flow in the open condition of the valve 7, is adjustable by way of a stroke limiting spindle 12 of the unit 11.

A first closure flap 8 is mounted at the opening of the inlet 1 into the antechamber 2. The flap 8 is pivotal about a horizontal axis between a closed position (FIG. 1) and an open position (FIG. 1a), and is balanced by a counter-weight 21 in such a way that when the flap 8 has no load of bulk material resting thereon, the flap 8 already opens almost the entire cross-sectional area of the opening of the inlet 1 into the antechamber 2 so that material flow is substantially unimpeded by the closure flap.

In a similar manner, a second closure flap 9 with balancing counter-weight 21 is mounted pivotally about a horizontal axis at the opening of the outlet of the antechamber 2 into the conveyor chamber 3.

Disposed in front of, i.e. below, the opening of the outlet 4 is a metering flap 10 for controlling to the desired value the amount of bulk material being discharged into and conveyed in the conduit 5.

The antechamber 2 is connected to the free atmosphere, by way of a dust separator (not shown), by a vent valve which includes a fluid-operated piston-cylinder unit 13, an exhaust air closure plate 15 actuated by the unit 13, and a vent conduit 17. Furthermore, the antechamber 2 is connected to the conveyor chamber 3 by way of a shut-off valve which includes a piston-cylinder unit 14, and a feed air closure plate 16, and a connecting conduit 18 connected to the shut-off valve 14, 16. The conduit 18 is in turn communicated with the clean air pressure conduit 6 by way of a branch conduit 19. In order to ensure that the closure flaps 8 and 9 close reliably, even when there is a relatively small pressure differential acting thereon, the connecting conduit 18 also opens in the respective chambers 2 and 3, by way of nozzles 22 directed towards the respective closure flap and closely adjacent thereto in the open position thereof. This provides that a small amount of air ejected by the nozzles 22 is sufficient to initiate the closing movement of the closure flaps 8 and 9 when they are wide open.

The apparatus operates as follows:

When the vent valve 13 and 15 is closed, air flows by way of the conduit 18 into the antechamber 2, after the shut-off valve 14 has been opened, so that an increased pressure is built up in the antechamber 2, above the atmospheric pressure obtained in the inlet 1. As a result, the first closure flap 8 is closed, assisted by the air jet from the upper nozzle 22. As soon as the pressure in the antechamber 2 is of substantially the same value as the pressure in the conveyor chamber 3 and, thus, also the pressure in the conduit 6, the second closure flap 9 opens under the weight of the bulk material thereon, thus opening the antechamber outlet so that the antechamber 2 empties into the conveyor chamber 3. This is the condition shown in FIG. 1. From the conveyor chamber 3, the bulk material then flows into the conveyor conduit 5, the amount of such flow being predetermined by the metering flap 10. At a moment which is predetermined by a control means (28 in FIG. 2) which may include a timing device for timed operation of the apparatus, the shut-off valve 14 and 16 closes, and the vent valve 13 and 15 opens the vent conduit 17. The resulting pressure differential as between the empty chamber 2 and the conveyor chamber 3, assisted by the air jet from the nozzle 22, carries closing of the second closure flap 9. Virtually simultaneously, the first closure flap 8 and, actuated by way of the above-mentioned control means 28 and the unit 11, the shut-off member 7, open, so that bulk material flows under gravity into the antechamber 2 (FIG. 1a) until the shut-off member 7 is closed again by direct action of the control means 28 or alternatively by a level sensing means 20' in the antechamber 2, which signals to the control means 28, said signal being shown by dot-dashed line 25 in FIG. 22. As soon as a level sensing means 20 in the chamber 3 signals to the control means 28 that the conveyor chamber 3 is almost empty, the control means 28 provides for reclosing of the vent valve 13 and 15 and re-opening of the shut-off valve 14 and 16, so that the apparatus is returned to the starting condition of FIG. 1 and a fresh operating cycle commences with refilling of the chamber 3.

Figure 2:
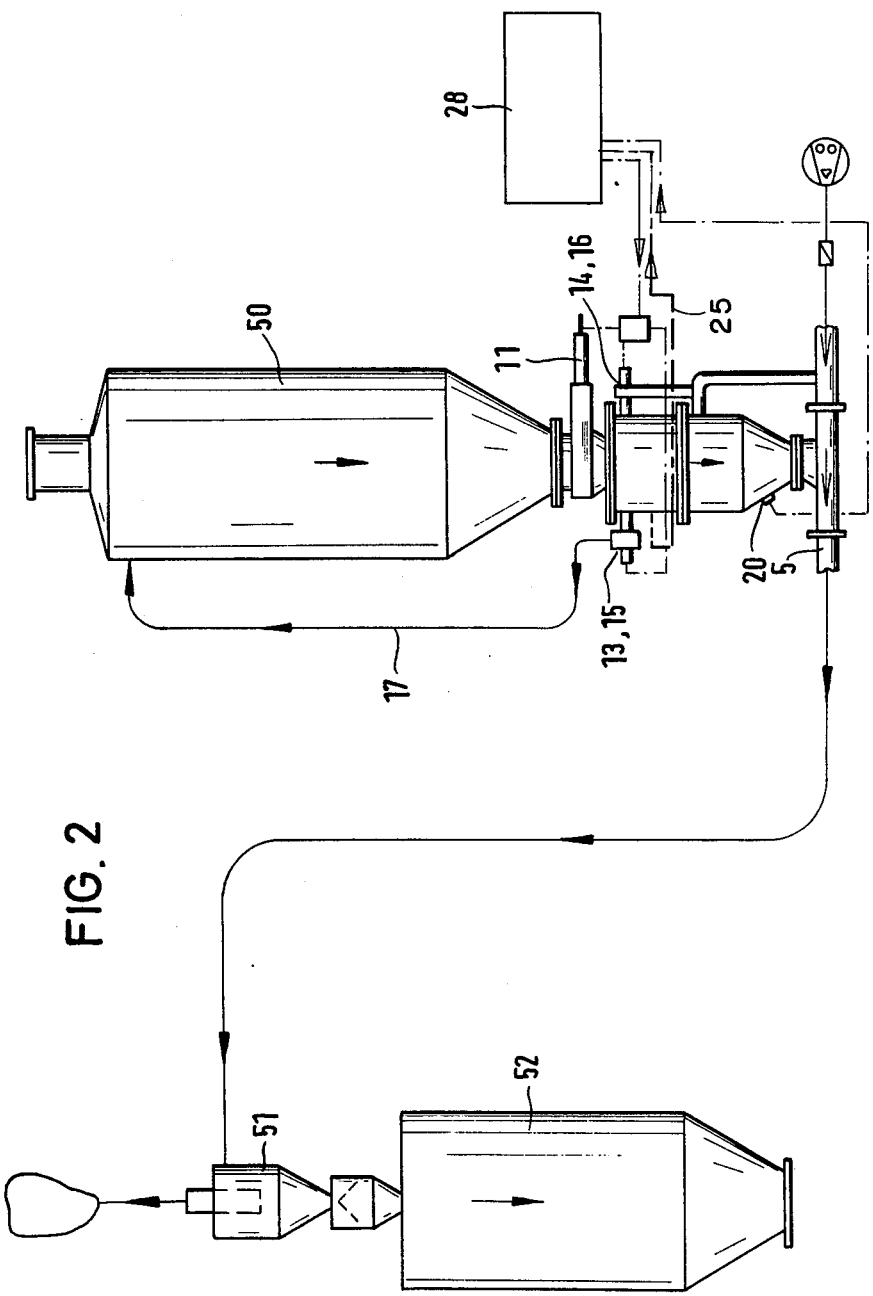

FIG. 2 shows equipment for conveying bulk material from a bulk material storage container 50, by way of the above-described delivery apparatus, the conveyor conduit 5 and a separator 51, for example to an intermediate storage container 52 for storing plastics granulate which is required for processing in, e.g., a plastics material extrusion press. The above-described mode of operation of the shut-off valve 14 and 16, the vent valve 13 and 15 and the shut-off member 7 is controlled by the control means 28 shown as contained in a control box. The mode of operation of this equipment is generally conventional.

The above-described delivery apparatus is pre-eminently suitable for the pneumatic transportation of even abrasive bulk materials which, as will be appreciated, should not tend to the formation of bridges or like clogging. Also, the apparatus can provide for the continuous pneumatic conveying of plastics material granulates, at very low speeds.

The above-described manner of actuating the closure flaps 8 and 9 not only has the advantage of a simpler structure than previously proposed mechanical actuating means, but also avoids the above-mentioned operational troubles, sealing difficulties and wear problems, which occur in apparatus, as discussed above, in which the closure flaps only open at most a narrow gap in the respective openings. This in turn makes it possible for the apparatus, and the FIG. 2 equipment provided therewith, to be operated at much higher operating pressures than hitherto. A further advantage is the extremely small actuating line required for actuation of the valves, while in addition, as the apparatus controls its own operating cycle by virtue of its being responsive to level of material in the respective chambers, it can completely eliminate dead periods.

It will also be appreciated that in the illustrated preferred form of the apparatus, the control means 28 actuates the shut-off member, i.e. the shut-off slide valve 7 at the bulk material inlet, substantially in the same cycle motion as the first closure flap 8. This arrangement avoids the first closure flap 8 having to close against the flow of bulk material, which benefits both the quality and the service life of the sealing action of the flap 8, while also keeping at a low level the force or pressure differential which is to be applied for the flap closing movement.

Various modifications may be made without thereby departing from the scope of the invention as defined by the appended claims.

I claim:

1. Apparatus for the delivery of bulk material into a pneumatic conveyor conduit, comprising a first chamber; an inlet into the first chamber for the introduction of bulk material thereinto; a first closure flap pivotal between a first position of closing the first chamber inlet and a second position of opening the first chamber inlet; a second chamber disposed below the first chamber; an outlet from the first chamber communicating with the second chamber for the transfer of bulk material from the first to the second chamber; a second closure flap pivotal between a first position of closing the first chamber outlet and a second position of opening the first chamber outlet, each said closure flap being counterbalanced whereby each closure flap when in a freely pivotal condition is at least substantially in its open position such that material flow is unimpeded by said closure flaps; an outlet from the second chamber for the discharge of bulk material therefrom into the conveyor conduit; a connecting conduit for a gas flow communication between the first and second chambers; shut-off valve means in the connecting conduit for preventing gas flow therefrom; a gas feed conduit connected to said connection conduit for introducing pressure gas thereinto; vent valve means communicating between said first chamber and free atmosphere; a nozzle disposed within each of said first and second chambers and in gas flow communication with said connecting conduit, each nozzle being positioned to direct a jet of pressure gas from said connecting conduit towards a respective said closure flap; level sensing means in the second chamber adjacent to said outlet from the second chamber; control means operatively connected to the shut-off valve means, the vent valve means and the level sensing means and operable, in response to a signal from the level sensing means that the material in the second chamber has fallen to a predetermined level, to actuate the shut-off valve means to an open position and said vent valve means to a closed position for filling the second chamber; and a flow shut-off member for preventing a flow of bulk material to said first chamber inlet when said first closure flap is closed to avoid said first closure flap having to close against the flow of bulk material; and wherein said control means actuates said shut-off member at least substantially in synchronization with said first closure flap.

2. Apparatus as set forth in claim 1 wherein said control means function to move said flow shut-off member to an open position substantially simultaneously with the closing of said second closure flap and the opening of said first closure flap, thereby permitting refilling of said first chamber.

3. Apparatus as set forth in claim 1 wherein said first chamber includes a further level sensing means operable to supply a signal to said control means for actuation of said flow shut-off member.

4. Apparatus as set forth in claim 1 wherein said vent valve means, said shut-off valve means and said flow shut-off member are each actuable by a respective fluid-operated drive means.

* * * * *